June 24, 1941.                L. M. C. SEAMARK                2,246,764
                                   VALVE
                            Filed May 26, 1939            3 Sheets-Sheet 1

Inventor
L. M. C. Seamark
by
W. E. Evans
Attorney.

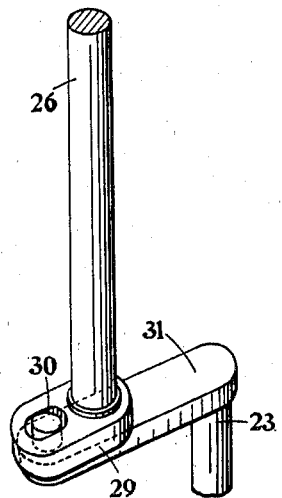
Fig. 3.
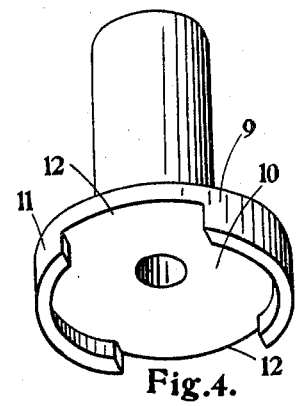
Fig. 4.
Fig. 6.
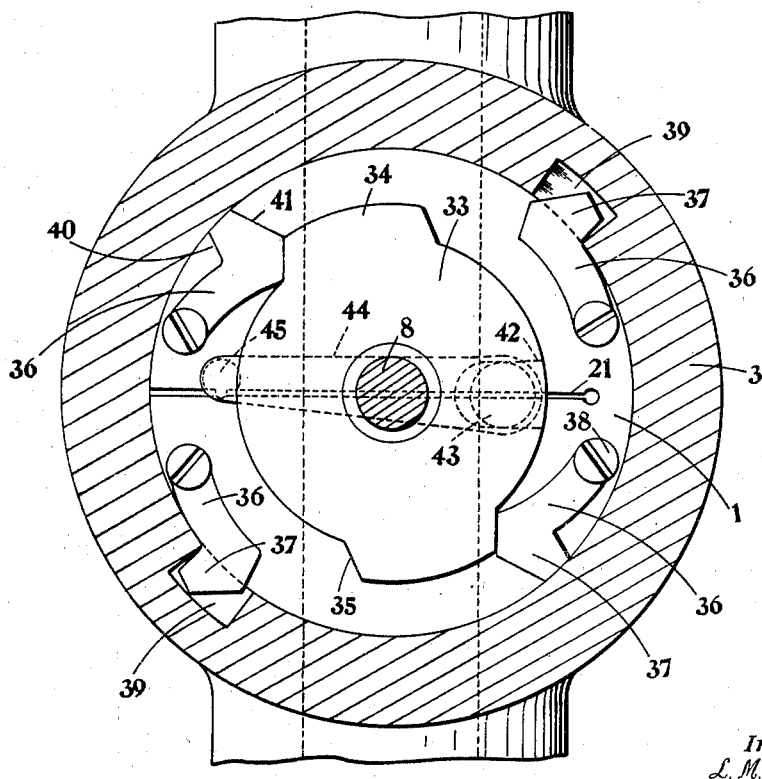

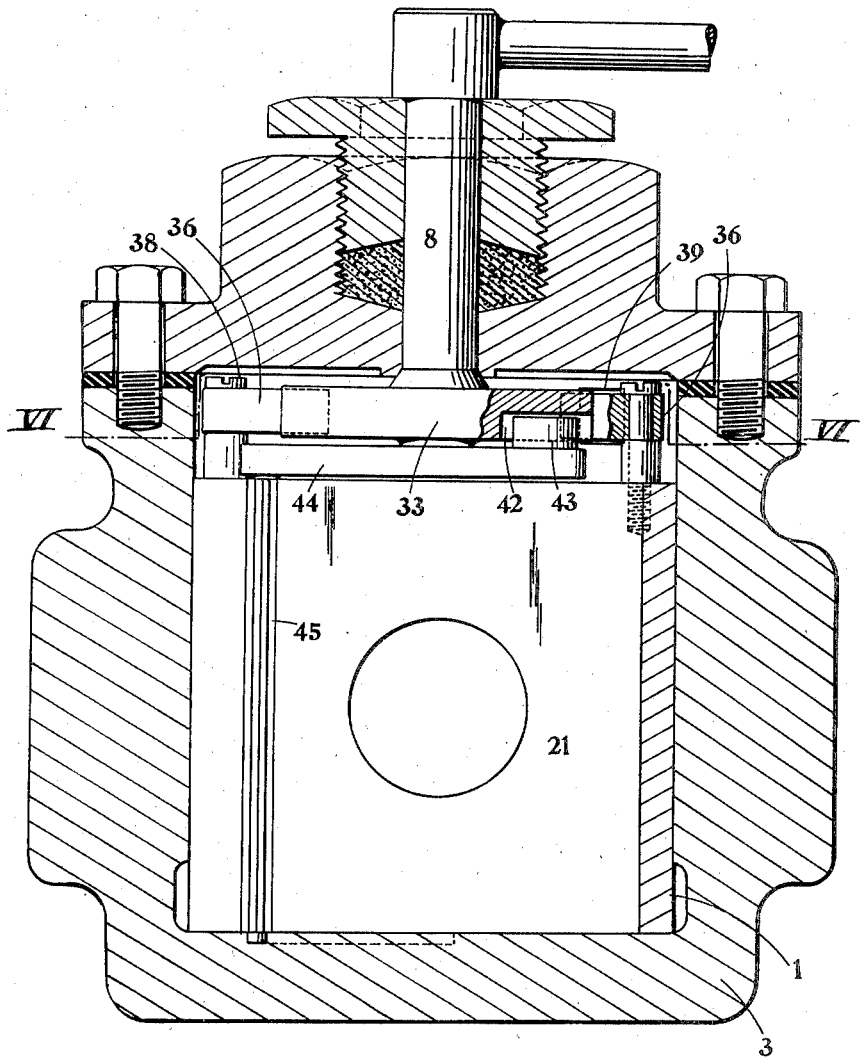

Patented June 24, 1941

2,246,764

UNITED STATES PATENT OFFICE 2,246,764

VALVE

Lewis Mervyn Cecil Seamark, Lyme Regis, England

Application May 26, 1939, Serial No. 275,922
In Great Britain May 28, 1938

6 Claims. (Cl. 251—102)

The invention relates to plug valves and is of particular application to plug valves which due to the conditions under which they are used require a considerable effort to operate them, as for example valves used in high pressure circuits.

The invention has among its objects to provide a plug valve of simple construction that is adapted for use in high pressure circuits and that is readily adapted to be opened and closed, and to provide a valve in which the sealing surfaces of the valve are maintained closely in contact and free from the entry of foreign matter which may be carried in the fluid in the conduit in which the valve is mounted.

According to the invention the valve plug is slotted and the slot is adapted to be expanded by a cam or expander element positioned off the axis of the valve plug to form a close pressure-tight fit in the valve body or seating in any position of the valve plug, and is adapted to be contracted so as to permit the valve plug to be readily rotated when the valve is being opened or closed.

Thus the valve plug may be formed with a slot that extends inwardly from the periphery but short of the opposed face of the plug, so as to be adapted for expansion and/or contraction, and means may be provided whereby the cam or expander element may be operated in the opening or closing of the valve by mechanism centered on the axis of the plug.

The invention further comprises the features of construction hereinafter described.

The invention is diagrammatically illustrated by way of example in the accompanying drawings, in which—

Figures 3 and 4 are detail perspective views of parts of the valve.

Figure 5 is a sectional side elevation of a modified construction, and

Figure 6 is a corresponding plan view on the line VI—VI of Figure 5.

Figure 1:
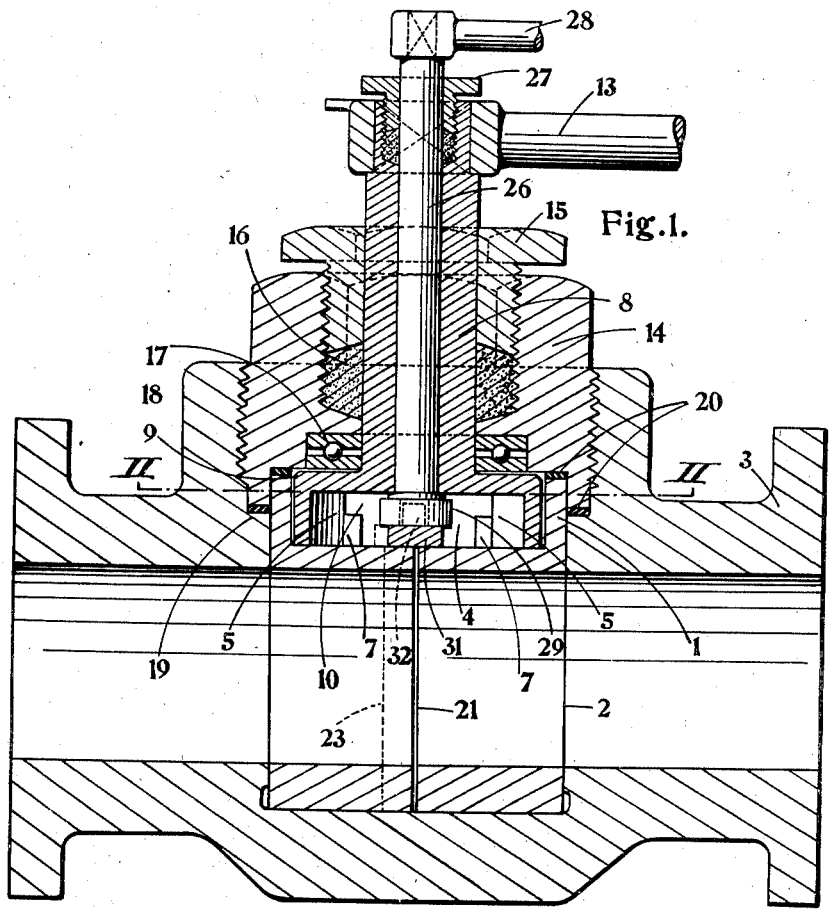
Figure 1 is a sectional side elevation of a valve constructed according to the invention.
Figure 2:
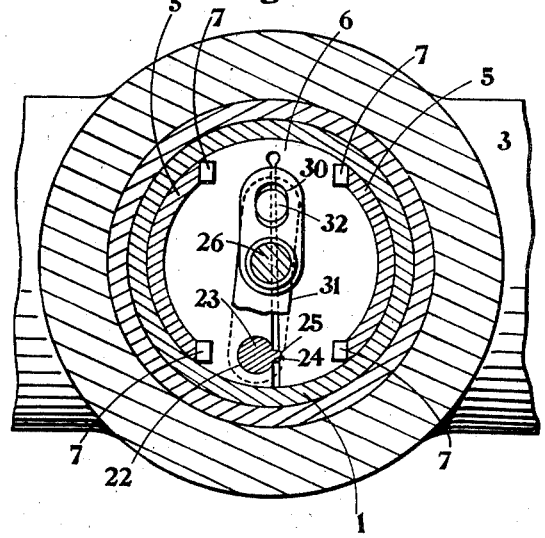
Figure 2 is a corresponding plan view from above on the line II—II of Figure 1.

In carrying the invention into effect, as illustrated in Figures 1 to 4 of the accompanying drawings, in its application to a plug valve for use in a high-pressure conduit, the valve comprises a cylindrical plug 1 having provided therein in the usual manner a transversely extending passage 2, the plug being adapted to be rotated in a valve body 3 to bring the passage into alignment with the conduit in which the valve is mounted in the opening of the valve. The valve plug 1 may be adapted to be rotated from the open position through for example 90° to close the valve and to obturate the flow of liquid through the valve.

The valve plug 1 is adapted to be rotated to open and close the valve by means operable from outside the valve body. For the purpose the valve plug 1 is recessed on the top face for the formation of a relatively shallow cylindrical cavity 4. Projecting upwardly from the base of the cavity and adjacent the circumferential wall 5 are abutments 7 of rectangular section.

The enlarged head 9 of the spindle 8 is formed in its underface with a cavity 10, the wall 11 of the head surrounding the cavity being cut away at diametrically opposite positions to leave gaps 12, so that the head 9 of the spindle may be applied with a loose fit within the cavity 4 in the plug 1, and so that the end faces of the wall 11 at the gaps 12 engage the adjacent lateral faces of the abutments 7 to cause a positive engagement so that the valve plug may be rotated by the spindle 8. The spindle 8 may be operated by means of an operating arm 13. The valve spindle extends upwardly in known manner through a packing gland consisting of a cylindrical member 14 having at the top an internally screw-threaded cylindrical cavity to receive a closing screw-plug 15 which serves to compress the packing 16 disposed around the valve spindle. The cylindrical member 14 is recessed on the underface to rest, with ball bearings 17 interposed, on the top face of the enlarged head 9 of the spindle. The member 14 is externally screw-threaded and is received into a cavity formed by a wall in the valve body that also is screw-threaded. The member 14 is provided on the underface with an annular shoulder 18 to seat on the circumferential rim of the surrounding wall 5 of the cavity 4 in the top face of the valve plug 1, the circumferential end face of the member 14 seating on a shoulder 19 formed in the valve body 3. Annular washers 20 are interposed between the contacting faces. The annular wall of the recess in the underface of the member 14 forms a sliding fit over the top of the valve plug 1.

The valve plug 1 is provided with a slot 21 extending through its whole length and diametrically across the plug from one peripheral surface to a distance short of the opposite peripheral surface, so that there remains an unslotted part 6. The slot is provided in the valve plug so as to lie with the ends equidistant between the abutments 7. In one lateral wall of the slot 21 at a position near the open end is formed a recess 22 advantageously of part-circular section and extending the length of the plug and parallel with the axis. Received slidably within the recess 22 so as to be rotatable therein is an expander bar or cam 23 of part circular cross-section and provided with a longitudinally extending rib 24 to project across the slot 21 into a groove 25 of a cross-section corresponding to that of the outer part of the rib whereby on rotation of the bar or cam 23 in either direction the projecting rib 24 exerts a force to widen the slot 21 in the valve plug and thus to expand the valve plug in the valve body. Means are provided whereby the bar or cam 23 may be rotated to cause the tightening of the valve plug in the valve body from a position outside the valve body. For the purpose the spindle 8 is formed with an axial bore in which is mounted a spindle 26 which extends at the upper end through a packing gland 27 and is provided as in the case of the valve operating spindle 8 with an operating arm 28. At its lower end the spindle 26 projects into the cavity 4 formed in the top face of the valve plug 1 and is provided with a horizontally extending foot member or crank 29 which is provided with a longitudinal slot 30.

The rotation of the bar or cam 23 is effected through the locking spindle 26 which is connected through the foot member 29 to a crank 31 on the upper end of the bar or cam 23. The crank 31 carries at one end an upstanding projection 32 in the form of a pin, to engage in the slot 30 of the crank 29.

At the lower end the bar or cam 23 may project into an arcuate groove in the valve body, with a washer interposed. Alternatively the bar or cam 23 may be provided shorter than the slot 21.

In operation the valve plug 1 is rotated in the valve body 3 through for example 90° to bring the plug from the closed position with the passage 2 disposed transversely to the longitudinal axis of the conduit within which the valve is mounted, into the open position in which the passage in the valve plug is in line with the longitudinal axis of the conduit, the rotation being effected by engagement of the head 9 of the valve spindle 8 with the abutments 7. When the valve plug has been rotated sufficiently to bring it into the open or closed position or into any desired intermediate position, the locking spindle 26 is rotated by means of the operating arm 28 to cause rotation of the bar or cam 23 through the crank 31, pin 32 and foot member 29 thus causing the rib 24 to move out of the groove 25 and to expand the slot 21 thus causing a frictional engagement between the valve plug 1 and the valve body 3.

The valve plug 1 may be mounted in the body 3 so that in the closed position the slot 21 has its open end turned towards the direction from which the liquid is flowing, in which case the pressure of the liquid serves as an additional force tending to expand the valve plug in the valve body.

In a modified construction, as illustrated in Figures 5 and 6 of the accompanying drawings, the operating movements and the sealing and unsealing of the valve plug may be effected by common means, the initial movement of the operating spindle being effective to rotate the bar or cam for contraction of the plug, the intermediate movement serving to open or close the valve and the final movement serving to rotate the bar or cam so as to tighten the valve plug in the open or closed positions. Thus the head of the spindle may be formed as a disc 33 with diametrically oppositely disposed projecting parts 34 having inclined faces 35.

Pivotally mounted in spaced positions on the top face of the valve plug 1 near the peripheral edge are four curved abutment members 36 formed with laterally projecting hammer heads 37, each pair of members on each side of the slot 21 being pivotally mounted by means of screws 38 in the annular cavity formed between the disc 33 and the inner peripheral wall of the valve body so that their heads are disposed one towards the other. The heads of the diametrically oppositely disposed pairs of members 36 are engaged respectively by the near faces 35 of the projecting parts 34 on rotation of the disc 33 in the clockwise direction and in the anti-clockwise direction.

The heads 37 of the members 36 are shaped so as to form line contact with the inclined faces 35 of the parts 34 of the member 33 when the member 33 is rotated to bear against two diametrically oppositely disposed members 36 when the pressure effecting rotation of the plug is being applied through those members to open or close the valve, the heads 37 of the said members then sliding upon the inner peripheral wall of the valve body.

The heads 37 of the members 36 project substantially radially outward and are adapted to be pressed in the limit of movement of the valve plug in the opening or closing of the valve into diametrically oppositely disposed cavities 39 of substantially rectangular section formed in the inner peripheral wall of the valve body, the lateral walls of the cavities being advantageously slightly undercut so as to ensure engagement with the surfaces 40 of the heads 37 of the members 36 when the valve plug has reached the limit of rotation in the opening or closing movement, the rotational movement of the plug being thus arrested.

The surfaces 41 of the heads 37 of the members 36 are formed at an inclination such that, on the reverse rotation of the disc 33 when the other of the inclined faces 35 of the projecting parts 34 engage with the heads 37 of the other diametrically oppositely disposed pair of members 36 which are mounted with their heads in the opposite direction, the said surfaces may strike upon the adjacent edges of the cavities 39 and slide thereon, as the members 36 are carried forward by the plug, so that the said members 36 pivot radially inwards and thus arrive in the position in which the heads 37 rest upon the inner peripheral wall of the valve body. The said members are thus in positions to be engaged by the projecting parts 34 when the direction of rotation of the disc 33 is again reversed. Thus it will be understood that the valve may be operated by rotation of the valve spindle 8 in either direction.

The form of the members 36 enables the greater part of the force applied through the parts 34 of the disc 33 on each member 36 to be utilised in rotating the plug, the inclined faces 35 of the parts 34 however, ensuring that a part of the force is exerted on the head of each of the members 36 forcing it radially outwards so that thus when it reaches the appropriate cavity 39 in the inner peripheral wall of the plug body it will enter the cavity and thus free the valve plug of the driving force of the projecting parts 34.

The disc 33 and member 36 are relatively so positioned that the disc is adapted for a further limited rotation after the heads 37 of the members 36 have been received into the civities 39 and the members have been released from the drive of the disc 33.

An elongated slot 42 is provided on the underface of the disc 33 in which engages a pin 43 projecting upwardly from a horizontally extending crank 44 secured at the other end to an expander bar or cam 45 formed and mounted in a manner similar to that of the bar or cam in the construction hereinbefore described, with reference to Figures 1 to 4 of the accompanying drawings.

A slot 21 is provided as in the construction referred to to enable the valve plug to be expanded when it is desired to tighten the valve plug in a given position relatively to the valve body.

It will thus be understood that in this construction the spindle 8 serves first to rotate the valve plug through a predetermined angle, for example 90°, from the completely open to the completely closed position, the further rotational movement of the spindle 8 being ineffective to cause further rotation of the valve plug but serving to rotate the expander bar or cam so that the projecting rib provided thereon is caused to move out of the groove in which it is seated and to expand the valve plug by widening the slot 21 and thus forming a frictional lock between the peripheral walls of the valve plug and the valve body.

I claim:

1. A valve of the plug type comprising a valve body having a seating therein for the valve plug and transverse passageways therein adapted on rotation of the valve plug to be brought into and out of coincidence with the transverse passageway in the valve plug, a valve plug divided by a slot extending the length of the valve plug and across the valve plug from one position at which the slot opens at its periphery to an opposite position short of the periphery at which the parts of the valve plug thus divided are connected by a small thickness of metal, an expander disposed lengthwise to move on its axis in the valve plug and held seated and exposed to the slot and in position away from that at which the parts of the valve plug divided by the slot are connected, the expander having a non-circular cross-section which at one position in the cross-section has an overall cross-sectional dimension greater than can be accommodated by the slot in the unexpanded condition of the valve plug, and means for causing movement of the expander on its axis to bring that part of its cross-section having the greater cross-sectional dimension into position to cause the expansion of the valve plug, comprising a spindle coaxial with the valve plug and having a manually operable part extending outward from the valve body, and inter-engaging elements of mechanism within the valve body in position between the inner end of the spindle and the upper end of the expander.

2. A valve of the plug type as specified in claim 1, in which the expander is held seated within the lengthwise cavity of a partially circular cross-section in position adjacent one face of the slot in the valve plug near its open end, the cavity forming a narrow space opening into the slot, the other face of the slot having formed therein a lengthwise groove in position opposite to the narrow space, the expander having an outwardly extending lengthwise rib adapted to extend through the narrow space and across the slot and to enter the groove, whereby in the normal position of the expander the outer edge of the rib engages in the groove, and the valve plug assumes its unexpanded condition, the rib on the movement of the expander passing out of the groove to protrude to one side thereof between the faces of the slot, whereby the parts of the valve plug divided by the slot are held separated and the valve expanded.

3. A valve of the plug type as specified in claim 1, having means for the rotation of the valve plug into and out of its open and closed positions, comprising a rotatable tubular valve spindle separate from but coaxial with the valve plug, within which tubular valve spindle the operating spindle of the expander is centrally disposed, the tubular valve spindle at its lower end and the valve plug at its upper end having positive inter-engaging elements disposed at each side the inter-engaging elements of the mechanism between the inner end of the central spindle and the expander, the movement imparted to the tubular valve spindle on the rotation of its externally operable parts being directly communicated to the valve plug.

4. A valve of the plug type as specified in claim 1, having means for the rotation of the valve plug into and out of its open and closed positions, comprising a rotatable tubular valve spindle separate from and in axial alignment with the valve plug, within which tubular valve spindle the operating spindle of the expander is centrally disposed, the tubular valve spindle at its lower end and the valve plug at its upper end having positive inter-engaging elements disposed at each side of the inter-connecting elements of mechanism disposed between the centrally disposed spindle and the expander, the said elements of mechanism consisting of a short arm mounted at the lower end of the centrally disposed spindle, and a long arm mounted upon the adjacent end of the expander, the arms being connected together one above the other at the adjacent ends by a pin and slot connection disposed away from the axis of the expander.

5. A valve of the plug type as specified in claim 1, comprising a valve plug having a shallow cavity at its upper end forming an upstanding cylindrical wall, a tubular valve spindle coaxial with the valve plug and having at its lower end downwardly extending clutch elements adapted for reception within the shallow cavity in the valve plug, within which are also disposed corresponding inter-engaging clutch elements, whereby the movement of the tubular valve spindle is directly transmitted to the valve plug, the spindle by which the expander is operated being disposed centrally within the tubular valve operating spindle, and the elements of mechanism engaging between the inner end of the centrally disposed spindle, and the expander being disposed in position in the cavity between the inter-engaging clutch elements.

6. A valve of the plug type as specified in claim 1, having a single spindle mounted in the upper part of the valve body and in position coaxial with the valve plug, two pairs of pivoted pawls mounted upon the valve plug at its upper face within an upper circular wall of the valve body, the abutment head of each pawl of the cooperating pairs of pawls being oppositely disposed in diametrically opposite position, and one of each pair of pawls being mounted in determined position upon each part of the valve plug divided by the slot, and each pawl having an abutment head formed with an inclined front face, a pair of cavities in said circular wall opening adjacent the path of movement of the pawls in the rotation of the coupling disc for the operation of the valve plug, said cavities being of a substantially dove-tail shape in horizontal cross-section and disposed in diametrically opposite positions in a substantially diagonal line with respect to a centre line passing through the transverse passageways in the valve body, for the reception of the abutment of the heads and withdrawal of the pawls not operative in the intended direction of movement of the valve plug, into position beside the said circular wall, and a coupling disc fixedly mounted upon the lower end of the spindle and in position above the valve plug and adjacent the surrounding pawls, the coupling disc having opposite outwardly extending parts forming outer peripheral contact faces which yield spaces within said circular wall sufficient for the relative movement therein of those pawls of the pair that have been withdrawn beside said circular wall on the rotation of the coupling disc and valve plug, the coupling disc having also short lateral faces at each side of the outer peripheral faces, the lateral faces at diagonally opposite positions serving together as abutment faces for the contact faces of the heads of the pawls of the respective pairs, the coupling discs having also inner peripheral faces in opposite positions intermediate of the outer peripheral faces, joining the inner ends of the lateral abutment faces, the inner peripheral faces thus yielding wider spaces within said circular wall for the accommodation of the respective pawls of a pair in the movement into positions in which they are engaged for the rotation of the valve plug on the operation of the coupling disc, as their heads are moved out of the respective dovetail cavities on contact of their inclined front faces with the forward edge of the respective dovetail cavity, whereby the lower front faces of the pawls of the actuating pair of pawls contact with the respective diametrically opposite abutment faces for the rotation of the valve plug in one direction or the other according to the direction of movement of the spindle and coupling disc, the coupling disc having on its under face and the operating arm of the expander on its upper face, a slot and pin connection, whereby on the rotation of the spindle the expander may be operated to cause the contraction of the valve plug into its normal condition, the sealing of the valve plug in its closed, open or other position, or the rotation of the valve plug to open or close it.

LEWIS MERVYN CECIL SEAMARK.